Oct. 21, 1969 G. E. HARMS 3,473,780

CONTROL APPARATUS

Filed May 11, 1967

INVENTOR.
GORDON E. HARMS
BY Charles J. Ungemach
ATTORNEY

United States Patent Office 3,473,780
Patented Oct. 21, 1969

3,473,780
CONTROL APPARATUS
Gordon E. Harms, Osseo, Minn., assignor to Honeywell Inc., Minneapolis, Minn., a corporation of Delaware
Filed May 11, 1967, Ser. No. 637,709
Int. Cl. F16k 31/12, 21/04; H01f 7/08
U.S. Cl. 251—76                                    5 Claims

ABSTRACT OF THE DISCLOSURE

An impulse solenoid reaction jet valve actuator in which the time duration of the valve open mode is independent of the characteristics of the drive circuitry. The valve has a momentarily open condition when the supply voltage is removed from the solenoid and the poppet valve is momentarily moved by a collision with a separate armature.

Background

This invention relates to solenoid actuators and more particularly to solenoid reaction jet actuators which produce an actuation of a poppet valve controlling the flow of propellant to a reaction jet used in a spacecraft or similar application. Reaction jet solenoid valves are commonly used in a reaction control system to provide a quantity of fuel over a controlled time interval to provide precise control of the attitude of the craft. Prior art actuators are conventionally operated by applying a voltage to the solenoid winding to directly open the valve. A problem common to valves of this type is that the pull-in and drop-out time characteristics of the valve are determined by the characteristics of the power supply and drive circuitry. Additional circuitry required to provide for a particular duration of solenoid actuation creates a weight and reliability problem.

A further problem with the prior art devices is the fact that the solenoid valve will remain open as long as a current is applied to the solenoid windings. Thus, for drive circuit failures which allow a current to continue to flow in the solenoid winding, a condition will exist wherein the fuel of the reaction control system would be expended through the open valve.

This invention was developed in response to the need for a solenoid actuator which will operate rapidly and produce a controlled duration actuation.

Description

The reaction jet solenoid valve actuator is constructed with a separate armature and poppet which are not rigidly connected. When the drive current to the solenoid is removed, the armature collides with the valve poppet and opens the valve rapidly for a time determined solely by the mechanical characteristics of the solenoid actuator.

It is an object of this invention to provide a solenoid valve actuator which has a very rapid opening time.

It is a further object of this invention to provide a solenoid valve actuator which opens for a time duration controlled by the characteristics of the valve and independent of the driver electronics.

It is a still further object of this invention to provide a reaction jet solenoid valve which remains in an unactuated condition when a drive current is flowing into the solenoid and in a momentarily actuated position when the solenoid drive current is removed.

Further objects and advantages will become apparent from a reading of the specification and claims in conjunction with the drawings wherein:

Figure 1:
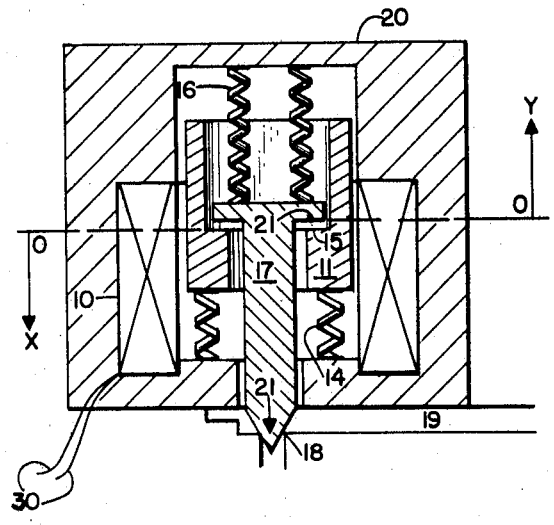
FIGURE 1 is a cross sectional representation of the solenoid valve in the unactuated position.

With reference to the figures, a valve is formed by a poppet 17 and a circular orifice 18 of a tubular fluid conductor 19. The poppet 17 is constructed of a magnetically inactive material and is basically cylindrical in shape. The bottom portion of the poppet is conical to provide a closure for the circular orifice 18. The upper portion of the poppet is constructed with a radius greater than that of the main body of the poppet to form an annular step 21. A first spring 16 is connected between an actuator housing 20 and the upper portion 21 of the poppet 17.

An armature 11, constructed of magnetically active material has the form of a hollow cylinder. The internal wall of the armature has, at the bottom, an inside radius slightly larger than the radius of the central cylindrical segment of the poppet but smaller than the radius of the upper portion of the poppet. The upper portion of the armature has a radius greater than the radius of the upper portion of the poppet. The transition from the smaller radius to the larger radius forms an annular step 15. A second spring 14 connects the actuator housing 20 to the lower portion of the armature 11.

A solenoid winding 10 including electrical input terminals 30 is enclosed within the actuator housing 20 and encircles the combination of the poppet 17 and the armature 11.

Operation

With reference to FIGURE 1, the position of the poppet 17 is maintained by a force from the first spring 16 such that the conical bottom portion of the poppet 21 closes the orifice 18. The position of the armature 11 is maintained by the second spring 14 such that the armature annular step 15 and the poppet annular step 21 are nearly in contact. This is defined as the quiescent position of the actuator.

Figure 2:
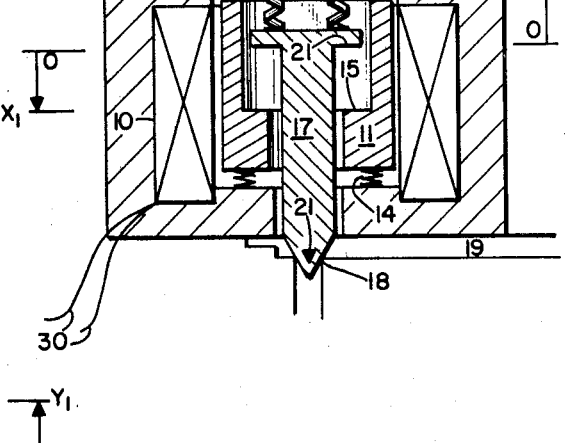
FIGURE 2 is a cross sectional representation of the solenoid valve with a steady state solenoid current flowing.

With reference to FIGURE 2, the armature 11 is drawn downward against the force of the second spring 14 to a distance $x_1$ when the solenoid winding is energized by a voltage at input terminals 30. The poppet 17 remains in the quiescent position with a displacement of $y=0$. The displacement of armature 11 from its quiescent position represents a potential energy $E_a$ available upon removal of current in the solenoid winding 10. The potential energy $E_a$ may be expressed as:

$$E_a = \tfrac{1}{2} k_1 x_1^2 \qquad (1)$$

where $k_1$ is the spring constant of the second spring 14 and is defined as the ratio of the force required to move a specific distance divided by that distance, and $x_1$ is the distance that the armature is moved when the solenoid 10 is energized.

Figure 3:
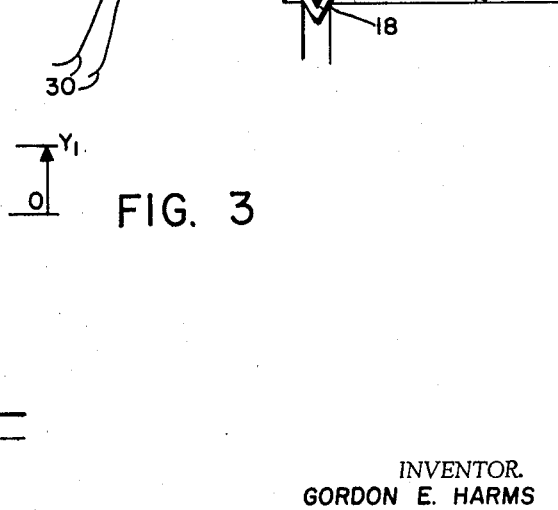
FIGURE 3 is a cross sectional representation of the solenoid valve shortly after the solenoid current is removed and after the collision between the armature and the poppet.

With reference to FIGURE 3, when the solenoid 10 is de-energized the armature 11 moves from a displacement of $x_1$ to slightly beyond the zero position until the armature annular step 15 contacts the poppet annular step 21. Assuming an elastic collision and a complete transfer of the energy and momentum of the armature to the poppet, several equations describing the system may be written. The momentum of an object is equal to the mass times its velocity and for the poppet and armature the momentum may be expressed as:

$$M_p \dot{y} = M_a \dot{x} \qquad (2)$$

where $M_p$ is the mass of the poppet $M_a$ is the mass of the armature $\dot{y}$ is the velocity of the poppet and $\dot{x}$ is the velocity of the armature. The kinetic energy of a object is equal to half of its mass times the square of the velocity of the object. The kinetic energy of the poppet and armature are given by:

$$\tfrac{1}{2}M_p \dot{y}^2 = \tfrac{1}{2} H_a \dot{x}^2 \qquad (3)$$

Solving Equation 2 for $\dot{x}$ and substituting the result into Equation 3 the following is obtained:

$$\tfrac{1}{2}M_p \dot{y}^2 = \frac{\tfrac{1}{2}M_p}{M_a}(M_p \dot{y}^2) \qquad (4)$$

From examination of Equation 4 it is apparent that in order for all of the kinetic energy of he armature 11 to be transmitted to the poppet 17 in an elastic collision the mass of the poppet 17 and of the armature 11 must be equal.

After the collision between the armature 11 and the poppet 17, the poppet 17 continues to move upward against the restoring force of the first spring 16 until the kinetic energy of the moving poppet is converted to potential energy in the compressed spring. The spring then forces the poppet back to the closed position. The time duration of the displacement of the poppet is dependent upon the natural frequency of the system consisting of the first spring 16 and the mass of the poppet 17. The natural frequency $f_n$ of the system is given by:

$$f_n = \frac{1}{2\pi}\sqrt{\frac{k}{M_p}} \qquad (5)$$

where $k$ is the spring constant and $M_p$ is the mass of the poppet. The time duration of the open time of the poppet $T_o$, is the time required for one-half period at the natural frequency and may be expressed as:

$$T_o = \pi \sqrt{\frac{k}{M_p}} \qquad (6)$$

it is thus seen that the open time of the poppet valve is a function only of the dynamics of the first spring 16 and the mass of the poppet 17 and is independent of the velocity attained by the armature 11 when the excitation voltage is removed from the solenoid 10.

Variation of mechanical parameters hereinbefore discussed may be performed to optimize various characteristics of the solenoid actuator. For example, a particular stroke amplitude of poppet motion can be calibrated by varying the velocity of the poppet after impact. Further known design techniques can be used to optimize the solenoid design for maximum kinetic energy and minimum operating time while drawing minimum electrical supply power. Synchronization of two solenoid valve actuators can be performed providing a valve actuator suitable for use in reaction control systems utilizing separate fuel and oxidizer valves.

I claim:

1. An impulse actuator comprising:
    solenoid means, including electrical input means and having a magnetic field output;
    armature means constructed of material such that a mechanical force may be exerted on said armature means by a magnetic field;
    first spring means in operative relation with said armature means and said solenoid means such that when said solenoid means is energized by introducing an electrical current into the input means of said solenoid means, the magnetic field appearing at said solenoid means magnetic field output means exerts a force on said armature means in opposition to and larger than the force exerted by said spring means resulting in a displacement of said armature means from a rest position determined by said first spring means;
    actuator output means constructed of magnetically inactive material; and
    second spring means in operative relation with said actuator output means such that said actuator output means is normally maintained in a quiescent position by said second spring means except during the interval immediately after said solenoid means is de-energized at which time said armature means is driven to a collision with said actuator output means by said first spring means, the collision of said armature means and said actuator output means displacing said actuator output means from its quiescent position to produce an actuator output until the restoring force of said second spring means returns the actuator output means to its quiescent position.

2. Apparatus of the class described comprising, in combination:
    an energizable solenoid having a movable armature;
    first spring means mounted to hold said armature in a normally quiescent position, energization of said solenoid moving said armature against said first spring means to an actuated position and upon the de-energization of said solenoid thereafter, said first spring means moving said armature from the actuated position momentarily past the quiescent position to a further position before returning to the quiescent position;
    a movable member having a first and second position; and
    means including second spring means mounting said movable member in a position with respect to said armature such that movement of said armature to the further position results in momentary movement of said movable member from its first position to its second position and thereafter back to the first position under the action of second spring as said armature returns to its quiescent position.

3. Apparatus of the class described comprising in combination:
    housing means;
    energizable solenoid means having movable armature means;
    means mounting said solenoid means in said housing means;
    first spring means in said housing means normally holding the armature means in a quiescent position, energization of said solenoid means moving the armature means to an actuated position to compress said first spring means, subsequent de-energization of said solenoid means allowing said first spring means to move said armature from the actuated position past the quiescent position in a predetermined path to a further position and back to the quiescent position;
    movable means; and
    means including second spring means mounting said movable means normally in a first position in the predetermined path so that the armature means collides with said movable means upon de-energization of said solenoid means thereby moving said movable means against said second spring means, said second spring means subsequently moving said movable means back to the first position after the armature means returns to the quiescent position.

4. A solenoid valve actuator comprising:
    housing means;
    fluid input means entering said housing means;
    fluid output means leaving said housing means;
    a poppet constructed of magnetically passive material comprising a central cylindrical segment, the top cylindrical segment with a radius larger than the radius of the central cylindrical segment forming an annular step between the segments, and a conical bottom portion; said poppet in operative relation with said housing means and said fluid output means such that the conical portion may be inserted into the fluid output means to block fluid flow therefrom;
    first spring means in operative relation with said housing means and said poppet such that the poppet conical portion is normally maintained in an inserted position by the spring force;

armature means consisting of a hollow cylinder of material capable of being attracted by a magnetic field with first and second segments of first and second internal radius respectively, said first internal radius larger than the radius of said poppet cylinder but smaller than the radius of the upper portion of said poppet, said second radius larger than the radius of the upper portion of said poppet, said first and second segments being divided by an armature annular step, said armature in operative relation with said poppet such that said poppet is enclosed by said armature with the cylindrical portion of said poppet enclosed by said second segment and the upper portion of said poppet enclosed by said first segment;

solenoid winding means including electrical input means in operative relation with said armature means, said housing means and said poppet means such that when an electrical current is applied to said solenoid said armature means is drawn into said solenoid winding means along the solenoid winding longitudinal axis and said poppet means is unaffected by said movement of said armature means; and second spring means in operative relation with said armature means in said housing means such that said armature means is maintained in a quiescent position wherein the annular step of said armature means is separated from the annular step of said poppet; said second spring means further operative to provide a force in opposition to the force applied by the magnetic field of said solenoid winding means when the current is introduced into the electrical input means, said force being sufficient upon removal of current to the electrical input means to force said armature means into a collision with said poppet means providing a momentary opening of the valve formed by the conical portion of said poppet and said fluid output means.

5. A solenoid valve actuator as described in claim 4 wherein the masses of the poppet and the armature are equal.

References Cited

UNITED STATES PATENTS

| 2,269,865 | 1/1942 | Shaw | 251—76 X |
| 2,651,744 | 9/1953 | Acklin et al. | 251—76 X |
| 2,705,608 | 4/1955 | Phillips | 251—129 X |
| 2,826,215 | 3/1958 | Wolfslau et al. | 251—129 X |
| 3,108,777 | 10/1963 | Ray | 251—129 X |

FOREIGN PATENTS 1,074,170   3/1954   France.

M. CARY NELSON, Primary Examiner

ROBERT C. MILLER, Assistant Examiner

U.S. Cl. X.R.

251—129; 335—259